United States Patent
Basler

(12) 
(10) Patent No.: US 7,512,047 B2
(45) Date of Patent: Mar. 31, 2009

(54) APPARATUS AND METHOD FOR READING FROM AND/OR WRITING TO OPTICAL RECORDING MEDIA

(75) Inventor: Stefan Basler, Brigachtal (DE)

(73) Assignee: Thomson Licensing, Boulogne Billancourt (FR)

( * ) Notice: Subject to any disclaimer, the term of this patent is extended or adjusted under 35 U.S.C. 154(b) by 284 days.

(21) Appl. No.: 10/584,646

(22) PCT Filed: Nov. 26, 2004

(86) PCT No.: PCT/EP2004/013505

§ 371 (c)(1),
(2), (4) Date: Jun. 26, 2006

(87) PCT Pub. No.: WO2005/069292

PCT Pub. Date: Jul. 28, 2005

(65) Prior Publication Data

US 2007/0171779 A1 Jul. 26, 2007

(30) Foreign Application Priority Data

Jan. 6, 2004 (EP) ................................. 04000083

(51) Int. Cl.
*G11B 7/00* (2006.01)
(52) U.S. Cl. .................................................. 369/53.23
(58) Field of Classification Search .................... None
See application file for complete search history.

(56) References Cited

U.S. PATENT DOCUMENTS 4,750,152 A * 6/1988 Yonekubo et al. ........ 369/44.24

(Continued)

FOREIGN PATENT DOCUMENTS

EP 0811971 12/1997

(Continued)

OTHER PUBLICATIONS

Patent Abstracts of Japan, vol. 2000, No. 14, Mar. 5, 2001 (LG Electronics Inc.) & JP 2000-315355.

(Continued)

*Primary Examiner*—Peter Vincent Agustin
(74) *Attorney, Agent, or Firm*—Robert D. Shedd; Robert B. Levy; Jorge Tony Villabon

(57) ABSTRACT

The present invention relates to an apparatus for reading from and/or writing to optical recording media capable of playback of an optical recording medium based on one single focus search cycle. The apparatus distinguishes between the types of optical recording media on the basis of the focus error signal and the data signal obtainable during focus search operation. An S-CurveOK signal, derived from the focus error signal, is the indication whether at all an optical medium is loaded. When a FocusOK signal, derived from the data signal, is active with dedicated settings for a high-reflectivity medium, this means that a high-reflectivity medium is loaded. However, when the FocusOK signal is not active, the apparatus deduces that a low-reflectivity medium is loaded. The operation mode for the second type of optical recording medium is adapted during the focus search cycle based on the combination of the S-CurveOK and FocusOK signals. The switching of the settings is performed before a focus search cycle has been completed. Hence, only one focus search cycle is required to find the focus point for both high- and low-reflectivity media settings.

15 Claims, 3 Drawing Sheets

U.S. PATENT DOCUMENTS

| | | | |
|---|---|---|---|
| 5,418,766 A * | 5/1995 | Fujisawa et al. | 369/53.23 |
| 6,061,318 A * | 5/2000 | Hwang | 369/53.23 |
| 6,469,965 B1 * | 10/2002 | Horita | 369/53.2 |
| 6,747,931 B1 * | 6/2004 | Park | 369/53.23 |

FOREIGN PATENT DOCUMENTS

| | | |
|---|---|---|
| JP | 10-134489 | 5/1998 |
| JP | 2000-315355 | 11/2000 |
| JP | 2002-157751 | 5/2002 |

OTHER PUBLICATIONS

Patent Abstracts of Japan, vol. 2002, No. 09, Sep. 4, 2002 (Victor Co.) & JP 2002-157751.

Patent Abstracts of Japan, vol. 1998, No. 10, Aug. 31, 1998 (Alpine Electron Inc.) & JP 10-134489.

Search Report Dated Feb. 11, 2005.

* cited by examiner

APPARATUS AND METHOD FOR READING FROM AND/OR WRITING TO OPTICAL RECORDING MEDIA

This application claims the benefit, under 35 U.S.C. § 365 of International Application PCT/EP04/013505, filed Nov. 26, 2004, which was published in accordance with PCT Article 21(2) on Jul. 28, 2005 in English and which claims the benefit of European patent application No. 04000083.8, filed Jan. 6, 2004.

The developers of increasingly complex players or recorders for optical recording media need to take into consideration a plurality of different factors. Japanese Pat. No. 08-303584 and 09-151031 disclose an optical recording media device and a method for discrimination of optical recording media where detailed description of the prior art and the related prior art problems are included.

For example, optical recording media of the type CD-RW (compact disk rewritable) have a reflectivity between 0.15 to 0.25 depending on the difference in structure of the signal recording layer of each optical disc. Optical recording media of the types CD-DA (compact disk digital audio) and CD-R (compact disk recordable) have a reflectivity which is by a factor of about 4 higher compared to CD-RW media. Similar figures apply to DVD/DVD±R (digital versatile disk (recordable)) and DVD±RW (digital versatile disk rewritable). Generally speaking, the optical recording media can be classified into high-reflectivity and low-reflectivity media. In order to play back a plurality of types of optical media which have different reflectivity two basic methods are used by apparatuses for reading from and/or writing to optical recording media in the prior art.

According to the first method, media detection cycles are performed first and then, depending on the results, focus search cycles are run with settings according to the detected media. In the focus search cycles, the settings for obtaining an optimum focusing condition of a light beam emitted by a laser diode are determined. According to the second method, the dedicated settings are chosen first and then focus search cycles alternate, wherein each cycle features either a dedicated high-reflectivity setting or a dedicated low-reflectivity setting. Both methods require more than one search cycle, either two or more focus search cycles or one or more media detection cycles followed by a single focus search cycle. This causes an increased start-up time of an apparatus for reading from and/or writing to optical recording media until playback or recording of the optical recording medium is possible. As a result, the delay caused by running multiple search cycles causes the apparatus' performance to be compromised. Accordingly, there is a need in the technology to overcome the aforementioned problems.

The present invention solves the above-mentioned problems of the prior art, and provides an apparatus for reading from and/or writing to optical recording media, and a method for distinguishing different types of optical recording media capable of reducing the start-up time, as well as playing back the information of a plurality of types of optical recording media in accordance with the type of the optical recording medium stably and accurately after one single focus search cycle.

In order to accomplish the goal of successful and accurate playback after one focus search cycle, the focus search function is subdivided into a number of sequence steps, wherein, while one sequence step is performed, not only the actual function of the step is run through but also the characteristics that may be relevant for the following step are looked for. Thereby, this method speeds up the overall sequence. In particular, the system of the present invention includes an optical lens system and two separate amplifiers, one for a servo signal path and the other for a data signal path. When during the focus search cycle the absolute value of the focus error signal exceeds a given threshold, an S-CurveOK signal is emitted. When a focal zero cross is detected, the amplitude of a data signal RF before and after this zero cross is determined and compared with a threshold value. When it is larger then the threshold value, a FocusOK signal is emitted, it is deduced that the given medium is a high-reflectivity medium, and the settings for the high-reflectivity medium are kept; when the peak amplitude is smaller than the threshold value, the apparatus automatically switches to the dedicated settings for the low-reflectivity medium. The combination of focus error signal FE and data signal RF, therefore, allows to distinguish between the two types of optical recording media. Hence, only one focus search cycle is required to find the focus point for both high-reflectivity and low-reflectivity media. Thus, the start-up/detection time frames are substantially reduced. Consequently, the apparatus performance is enhanced due to the ability to detect the optical recording medium and to distinguish among a plurality of types of optical recording media in one single focus search cycle. By providing more than one threshold value it is further possible to distinguish between more than two types of optical recording media, i.e. high-, low-, and intermediate-reflectivity media. Furthermore, the method is favourably combined with a discrimination between different families of optical recording media, which can be based on other physical parameters of the recording media such as cover layer thickness or the like. For example, first a discrimination between CD- or DVD-type optical recording media is done. Then the focus search function is started. It is likewise possible to start the focus search function first and two perform the discrimination between CD- or DVD-type optical recording media afterwards. Of course, the discrimination does not need to be limited to CD and DVD. Other media like BD (Blu-ray disk) or future media formats can also be included.

For a better understanding of the invention, an exemplary embodiment is specified in the following description with reference to the figures. It is understood that the invention is not limited to this exemplary embodiment and that specified features can also be expediently be combined and/or modified without departing from the scope of the present invention. In the following reference is made to optical recording media of the types CD-DA/CD-R and CD-RW as examples for high- and low-reflectivity media. Of course, as indicated before the invention is likewise applicable to other types of optical recording media which can be classified into high- and low-reflectivity media. In the figures:

Figure 1:
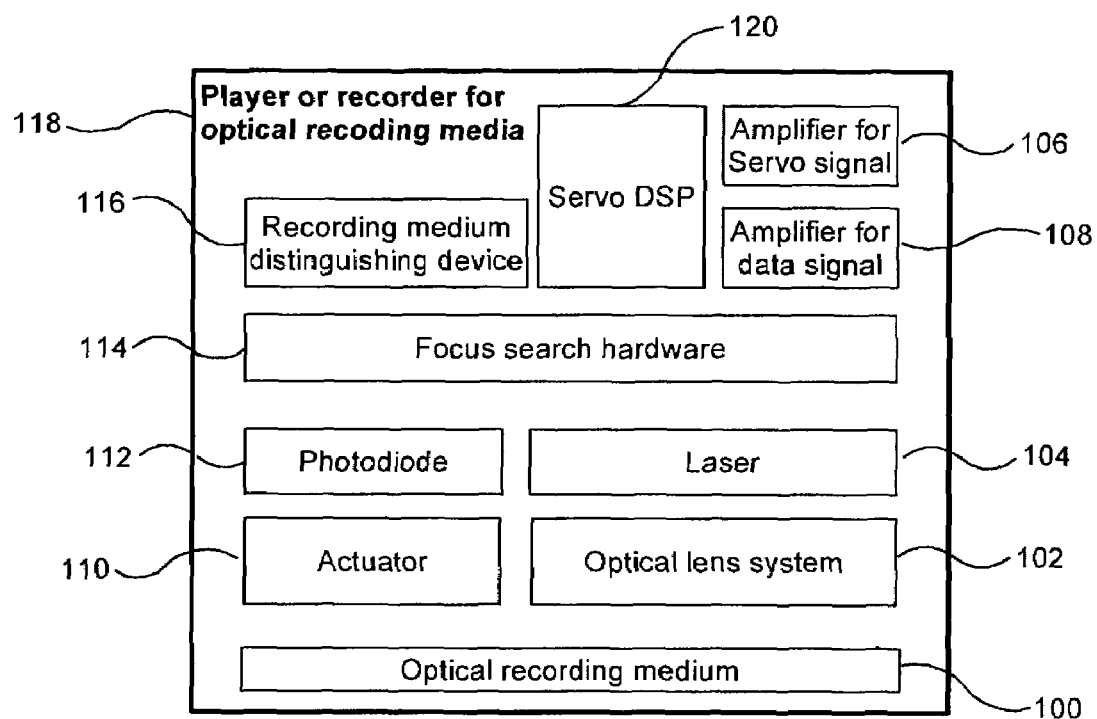
FIG. 1 is a block diagram illustrating a general configuration of an apparatus for reading from and/or writing to first and second types of optical recording media according to a preferred embodiment of the present invention.

FIG. 1 is a schematic block diagram showing a general configuration of an apparatus for reading from and/or writing to optical recording media according to the present embodiment, wherein the reference numeral 100 denotes an optical recording medium inserted into the apparatus 118. The optical recording medium is irradiated with a light beam emitted by a laser diode 104 through an optical lens system 102. The light reflected from the surface of the optical recording medium again passes through an objective lens of the optical lens system 102. A photodiode element 112 comprising one or more photodetectors is used to convert the reflected laser light into electrical signals. After insertion of the optical recording medium 100 in the apparatus 118, or after power-up of the apparatus 118, a focus search cycle is executed which moves the objective lens in the vertical direction towards the optical recording medium 100 in an open loop manner allowing to focus the light beam on a reflective surface of the optical recording medium 100. A focus search hardware block 114 is sensitive to an absolute amplitude of a focus error signal FE, which forms a characteristic curve, the S-curve. The focus search is performed by applying a ramp signal to a focus actuator 110 and closing the focus control loop if the focal point is found.

The apparatus 118 further comprises two separate RF amplifiers, one for a servo signal path, amplifier 106, and one for a data signal path, amplifier 108. The two amplifiers 106, 108 can be configured in each case either for CD-DA/CD-R or CD-RW. The signals detected from the optical recording medium 100 are supplied to both amplifiers 106, 108 simultaneously. In addition, the signals are supplied to an optical recording medium distinguishing device 116, which is able to distinguish whether the inserted optical recording medium 100 is a CD-DA/CD-R, a CD-RW, or whether no optical recording medium has been inserted. The type of the optical recording medium 100 is distinguished based on two types of signals: the focus error signal amplitude and also the amplitude of the data signal RF. An S-CurveOK signal indicates whether at all an optical recording medium is loaded. When the player has the CD-DA/CD-R settings and at the same time a FocusOK signal is active, this means that a CD-DA/CD-R medium is loaded. However, when the FocusOK signal is not active at the time when the S-CurveOK signal is received, the player deduces that a CD-RW medium is loaded. The S-CurveOK signal is derived from the focus error signal FE, which is calculated by a digital signal processor dedicated to the servo loop processing—Servo DSP 120.

The S-CurveOK signal becomes active when the focus error signal exceeds a first threshold and is deactivated when the focus error signal falls below a second threshold. The first threshold is somewhat larger than the second threshold, but both are not too far from the zero crossing point. The FocusOK signal is derived from the data signal RF and becomes active when the amplitude of the data signal RF exceeds a threshold. It is deactivated when the signal falls below the threshold. The thresholds can be adjusted in such a way that the expected signals are generated for the entire algorithm in order to make sure that the different optical media can be easily distinguished. In other words, if a focus search is performed with the CD-DA/CD-R settings when a CD-RW medium is present in the apparatus, a certain signal relationship is calculated which allows to deduce the presence of a CD-RW medium even though the system is operated with non-CD-RW settings. Thus, when on the base of this knowledge the indication is received that the optical recording medium loaded into the apparatus is a CD-RW medium, the focus search cycle performed with the CD-DA/CD-R settings is abbreviated. A switching to the appropriate CD-RW settings is automatically performed during the same focus search cycle operation, and not later in the next cycle like it was the case in the prior art. Hence, only one focus search cycle is required to find the focus point for both CD-DA/CD-R and CD-RW media.

Figure 2:
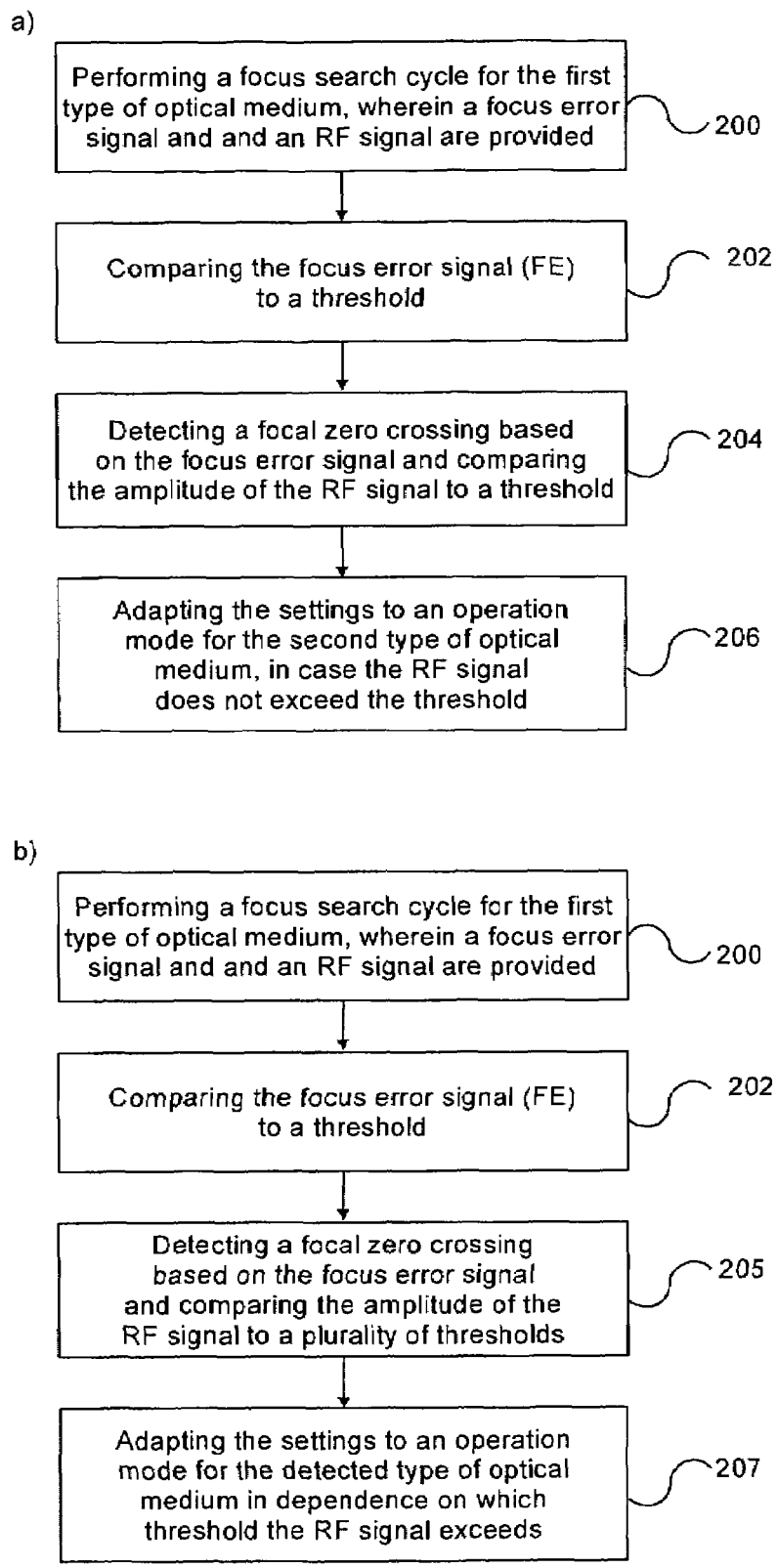
FIG. 2 is a flowchart of a process describing a method of the present invention.

FIG. 2 depicts a corresponding process in two flow charts. The first flow chart a) relates to the discrimination between only two types of recording media. In a step 200 a focus search cycle for the first type of optical recording medium is performed, wherein a focus error signal FE and a data signal RF are generated. In the next step 202, the focus error signal FE is compared to threshold values. Subsequently, a focal zero crossing based on the focus error signal FE is detected 204 and the amplitude of the data signal RF is compared to a threshold value. In the last step 206 the settings are adapted to an operation mode for the second type of optical recording medium, in case the amplitude of the data signal RF does not exceed the threshold.

The second flow chart b) relates to the discrimination between more than two types of recording media, i.e. high-, low-, and intermediate-reflectivity media. While the steps 200 and 202 are the same for both processes, in this case in a step 205 the amplitude of the data signal RF is compared to a plurality of threshold values. In the last step 207 the settings are adapted to an operation mode for the detected type of optical recording medium in dependence on which threshold the amplitude of the data signal RF does exceed.

Figure 3:
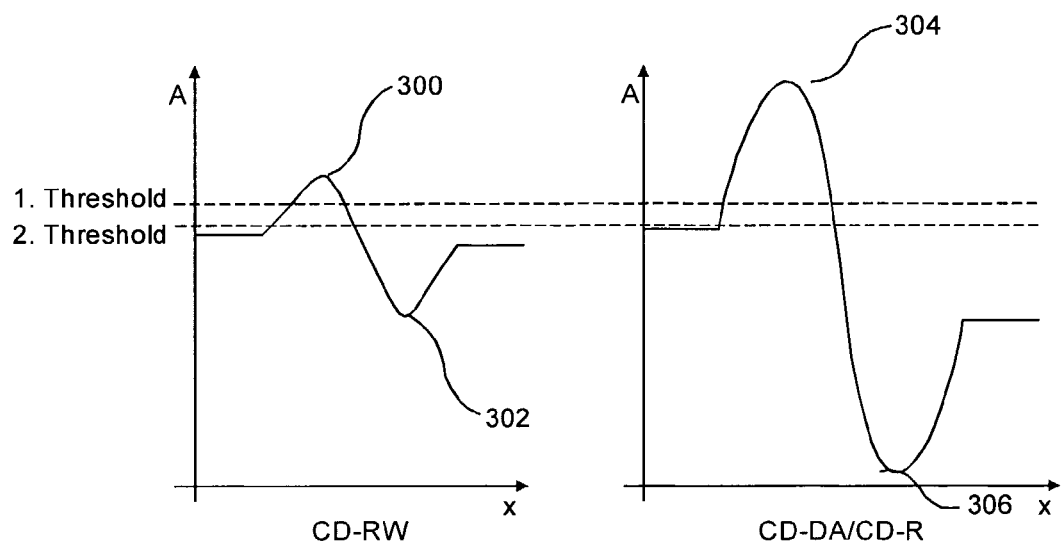
FIG. 3 illustrates the comparison of the S-curve to the threshold.

FIG. 3 shows the so called S-curve, which is detected during the focus search operation and which is derived from the focus error signal FE while moving the objective lens along a line between a position farthest from the optical recording medium and a position closest to the optical recording medium. Plotted is the signal amplitude A against the lens position x. During moving toward and away from the measurement surface the zero cross point of the S-curve signal is detected. The amplitude 300, 304 of the signal before and the amplitude 302, 306 of the signal after this zero cross are determined and compared with a threshold given by the first and second thresholds. The S-CurveOK signal becomes active when the focus error signal FE exceeds the first threshold and is deactivated when the focus error signal falls below the second threshold. The first threshold is somewhat larger than the second threshold, but both are not too far from the zero crossing point.

Figure 4:
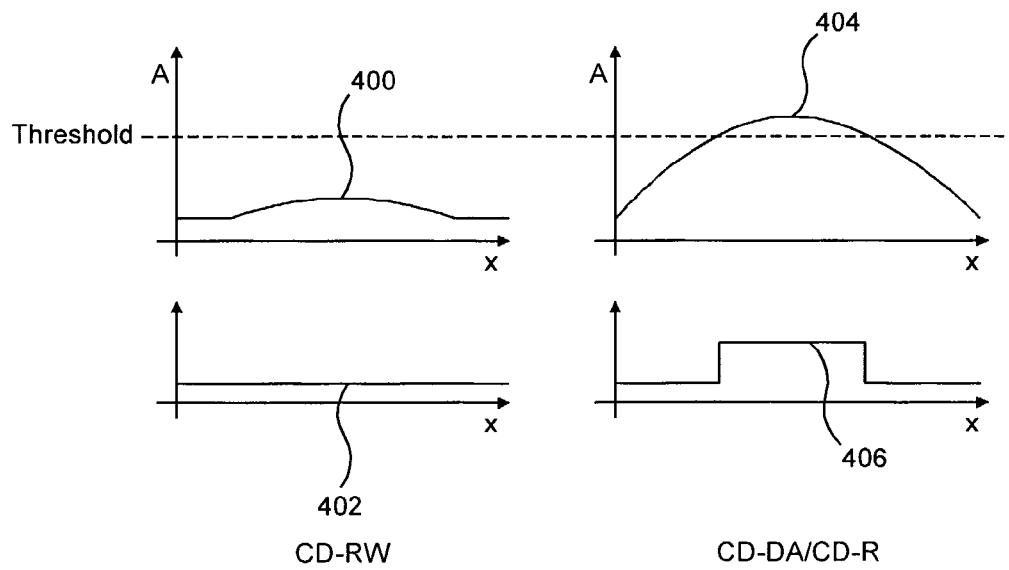
FIG. 4 illustrates the data signal RF and the FocusOK signal.

FIG. 4 shows the data signal RF 400, 404 and derived from it the FocusOK signal 402, 406 when CD-DA/CD-R settings are applied during the focus search cycle. Plotted are the signal amplitude A and the logic level against the lens position x. The FocusOK signal becomes active when the amplitude of the data signal RF exceeds a given threshold and it is deactivated when the signal falls below the threshold. There is a difference in the amplitude that can be observed for CD-DA/CD-R media and CD-RW media with CD-DA settings. When a CD-DA medium is loaded the RF signal 404 is larger then the threshold. When a CD-RW medium is present, the RF signal 400 is lower then the threshold. Consequently, when the FocusOK signal 406 is active, this means that a CD-DA/CD-R medium is loaded. However, when the FocusOK signal 402 is not active, this means that a CD-RW medium is loaded.

Although the present invention has been described in detail with reference to certain preferred versions thereof, other versions are possible.

The invention claimed is:

1. An apparatus for reading from and/or writing to at least a first and a second type of optical recording media, comprising:
   a) means for performing a focus search cycle for the first type of optical recording medium with a focus error signal and a data signal,
   b) means for comparing the focus error signal and the data signal to respective thresholds and for indicating the presence of an optical recording medium,
   c) means for detecting a focal zero crossing based on the focus error signal, and d) means for adapting settings to an operation mode for the second type of optical recording medium in case the data signal does not have a given relation to the respective threshold near the focal zero crossing, which distinguishes between a high reflectivity optical recording medium and a low reflectivity optical recording medium.

2. The apparatus of claim 1, wherein the switching to the second type of optical recording medium is performed before the completion of a focus search cycle.

3. The apparatus of claim 1, further including a first amplifier for a servo path signal and a second amplifier for a data path signal.

4. The apparatus of claim 1, wherein the indication that a low-reflectivity medium is loaded into the device causes the current search cycle with settings for a high-reflectivity medium to be abbreviated and to be continued with settings for a low-reflectivity medium.

5. A method for distinguishing between at least a first and a second type of optical recording media, comprising:
   a) performing a focus search cycle for the first type of optical recording medium, whereby a focus error signal and a data signal are provided.
   b) comparing the focus error signal and the data signal to respective thresholds and indicating the presence of an optical recording medium,
   c) detecting a focal zero crossing based on the focus error signal, and
   d) adapting settings to an operation mode for the second type of optical recording medium in case the data signal does not have a given relation to the respective threshold near the focal zero crossing, which distinguishes between a high reflectivity optical recording medium and a low reflectivity optical recording medium.

6. The method of claim 5, further including the step of using an algorithm in order to distinguish between the types of optical recording media based on the signal relationship.

7. The method of claim 6, wherein the algorithm is designed to adapt settings to an operation mode for the second type of optical recording medium in a single focus search cycle.

8. A method for distinguishing between at least a first and a second type of optical recording media, comprising:
   a) performing a focus search cycle for the first type of optical recording medium, whereby a focus error signal and a data signal are provided,
   b) comparing the focus error signal and the data signal to respective thresholds and indicating the presence of an optical recording medium,
   c) detecting a focal zero crossing based on the focus error signal, and
   d) adapting settings to an operation mode for the second type of optical recording medium before the completion of a focus search cycle in case the data signal does not have a given relation to the respective threshold near the focal zero crossing.

9. The method of claim 8, wherein the first type of optical recording medium to be distinguished is a high-reflectivity medium and the second type of optical recording medium is a low-reflectivity medium.

10. The method of claim 8, further including the step of using an algorithm in order to distinguish between the types of optical recording media based on the signal relationship.

11. An apparatus for reading from and/or writing to at least a first and a second type of optical recording media, comprising:
   a) means for performing a focus search cycle for the first type of optical recording medium with a focus error signal and a data signal,
   b) means for comparing the focus error signal and the data signal to respective thresholds and for indicating of the presence of an optical recording medium,
   c) means for detecting a focal zero crossing based on the focus error signal, and
   d) means for adapting settings to an operation mode for the second type of optical recording medium before the completion of a focus search cycle in case the data signal does not have a given relation to the respective threshold near the focal zero crossing.

12. The apparatus of claim 11, wherein the first type of optical recording medium to be distinguished is a high-reflectivity medium and the second type of optical recording medium is a low-reflectivity medium.

13. The apparatus of claim 11, further including a first amplifier for a servo path signal and a second amplifier for a data path signal.

14. The apparatus of claim 11, wherein the indication that a low-reflectivity medium is loaded into the device causes the current search cycle with settings for a high-reflectivity medium to be abbreviated and to be continued with settings for a low-reflectivity medium.

15. An apparatus for reading from and/or writing to at least a first and a second type of optical recording media, comprising:
   a) means for performing a focus search cycle for the first type of optical recording medium with a focus error signal and a data signal,
   b) means for comparing the focus error signal and the data signal to respective thresholds and for indicating of the presence of an optical recording medium,
   c) means for detecting a focal zero crossing based on the focus error signal, and
   d) means for adapting settings to an operation mode for the second type of optical recording medium in case the data signal does not have a given relation to the respective threshold near the focal zero crossing, wherein an indication that a low-reflectivity medium is loaded into the device causes the current search cycle with settings for a high-reflectivity medium to be abbreviated and to be continued with settings for a low-reflectivity medium.

* * * * *